United States Patent
Burns et al.

(10) Patent No.: US 6,528,928 B1
(45) Date of Patent: Mar. 4, 2003

(54) SWITCHED RESONANT POWER CONVERSION ELECTRONICS

(75) Inventors: Joseph R. Burns, deceased, late of Pennington, NJ (US), by JoAnn E. Burns, executrix; Paul Smalser, Trenton, NJ (US); George W. Taylor, Princeton, NJ (US); Thomas R. Welsh, Princeton, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 0 days.

(21) Appl. No.: 09/933,158

(22) Filed: Aug. 20, 2001

(51) Int. Cl.[7] ............... F03B 13/12; F03C 02/08; H01L 41/08
(52) U.S. Cl. ............... 310/339; 250/42; 250/53; 50/497; 322/2 R
(58) Field of Search ............... 310/339; 250/42, 250/53; 50/497; 322/2 R

(56) References Cited

U.S. PATENT DOCUMENTS

| | | | |
|---|---|---|---|
| 5,578,889 A | * 11/1996 | Epstein | 310/339 |
| 5,770,893 A | * 6/1998 | Youlton | 290/53 |
| 5,814,921 A | * 9/1998 | Carroll | 310/339 |
| 5,955,790 A | * 9/1999 | North | 290/53 |
| 6,376,968 B1 | * 4/2002 | Taylor et al. | 310/339 |

* cited by examiner

Primary Examiner—Thomas M. Dougherty
(74) Attorney, Agent, or Firm—Henry I. Schanzer

(57) ABSTRACT

A transducer operated as power generating device is driven at a low frequency and collects energy at the low frequency rate. The collected energy is extracted at a much higher frequency. Extracting the energy at a higher frequency enables the use of components, such as inductors, having reasonable values and sizes. In one embodiment, a power extracting circuit which includes elements designed to resonate with the transducer at a higher frequency than the frequency at which the transducer is being driven is periodically switched in circuit with the transducer. Thus, the electric power generator device operated and controlled by a slowly changing source of energy (e.g., ocean waves, wind, eddies of water) may develop energy at one frequency and may be operated to transfer the energy at another frequency. The resonating circuit is switched into circuit with the transducer on the positive and negative peaks of the force driving the transducer for a time approximately equal to Tc, where Tc is equal to approximately ½fo, where fo is the resonant frequency of the circuit with the switch closed. In another embodiment the load applied to the circuit is designed to have an optimum value to optimize the power transfer. Other embodiments include circuits for reliably and accurately detecting the peak(s) of the driving input signals.

44 Claims, 15 Drawing Sheets

FIG. 12F1

SWITCHED RESONANT POWER CONVERSION ELECTRONICS

BACKGROUND OF THE INVENTION

This invention relates to controlling the transfer of energy from a power generator to a load so as to increase the efficiency of the transfer.

By way of example, a capacitive electric power generator may include a piezoelectric device functioning as a capacitive piezoelectric generator (PEG) which when subjected to mechanical stresses and strains produces an electrical signal. The electrical signals of one, or more, of these piezoelectric devices may be processed to produce electrical power which can be used to operate electrical/electronic devices and/or which can be part of an electrical power grid. Systems making use of piezoelectric devices to produce electrical power are shown, for example, in U.S. Pat. Nos. 5,552,656 and 5,703,474 which issued Sep. 3, 1996 and Dec. 30, 1997, respectively, and which are assigned to the assignee of the present application, and whose teachings are incorporated herein by reference.

Piezoelectric devices used as electric power generators are characterized by an inherent inefficiency in the transformation ("coupling") of the mechanical strains and stress into electrical charge. As a result, only a small portion (e.g., approximately 10%) of the mechanical stress/strain applied to a piezoelectric device is available as electrical power when a constant load is applied to the piezoelectric device. It is therefore desirable to increase the efficiency with which the energy generated by a piezoelectric device is transferred to a load to compensate for, and overcome, the low "coupling" factor of the piezoelectric devices.

A known method for increasing the efficiency of the transfer from the piezoelectric generator to a load includes forming a resonant circuit. This is shown, for example, in FIG. 1, which is a highly simplified block diagram representation of a prior-art piezoelectric electric power generator circuit. The stresses and/or strains applied to the piezoelectric device are provided by sources of energy (e.g., ocean waves, wind, eddies of water) which may vary slowly (e.g., a few cycles per second). Consequently, the piezoelectric devices may be operated at very low frequencies and the frequency of the electrical signals produced by these piezoelectric devices is also in the range of a few cycles per second. These low operating frequencies present significant problems to the efficient transfer of energy from the piezoelectric device to a load.

For example, it is difficult to form inductors and transformers of reasonable size and at a reasonable cost which can operate at those frequencies. Referring to FIG. 1, by way of example, note that the circuit includes a piezoelectric device 22 coupled by an inductor 16 to a load 27. The resonant frequency (fo) of the circuit may be expressed as $fo = \frac{1}{2\pi}(LCp)^{0.5}$; where Cp is the capacitance of the piezoelectric device 22; and L is the inductance of inductor 16, with the value of L being selected to resonate with the capacitance of the piezoelectric device. [Note: for ease of explanation and discussion, the contribution of other capacitances in the circuit have been ignored in the specification and claims which follow]. The capacitance of Cp may be assumed to be in the range of 0.01 to 10 microfarads ($10^{-6}$ farads). Assume now that the frequency of the electric signal, produced by the piezoelectric device in response to the mechanical driving force, is in the range of 2 Hz. Then, in order to have a circuit that resonates at 2 Hz, an inductor 16 having a value in the range of 12,000 Henrys would be needed. An inductor of this value would be the size of a small room. In addition, direct electrical resonance is not practical because of the expected variability of the frequency due to the random nature of ocean waves.

SUMMARY OF THE INVENTION

Applicants' invention resides in part in the recognition that while a power generating device which is operated at a low frequency captures energy at the low frequency rate, the collected energy may be extracted at a much higher frequency. Extracting the energy at a higher frequency enables the use of components, such as inductors, having reasonable values and sizes compared to the prior art systems.

Applicants' invention also resides in the recognition that a power extracting circuit can be periodically switched to be in circuit with a power generating device with the power extracting circuit including elements which can resonate with the power generating circuit at a higher frequency than, and independent of, the frequency at which the power generating device is being operated. Thus, the electric power generator device operated and controlled by a slowly changing source of energy (e.g., ocean waves, wind, eddies of water) may develop energy at one frequency and may be operated to transfer the energy at another frequency.

Applicants' invention also resides in the recognition that an inductive load can be periodically switched in circuit with a capacitive power generating circuit for a selected period of time to maximize the power extracted from the power-generating circuit.

Applicants' invention also resides in the recognition that where the capacitive power generator produces an oscillatory electrical signal that it is preferable to switch an inductive power extracting circuit on the positive and negative peaks of the oscillatory electrical signal.

Applicants' invention also resides in the recognition that where the capacitive power generator produces an oscillatory electrical signal at a low first frequency (f1), that it is preferable to switch into the system an inductive power extracting circuit designed to resonate with the capacitive power generator at a resonant frequency (fo), which is substantially greater than f1, on the positive and negative peaks of the first oscillatory electrical signal, such that power will be extracted in a electrical pulse which begins at switch closure and ends when the current reaches zero in the inductor. The time of switch closure Tc is equal to approximately ½fo, where of is the resonant frequency of the source and load circuit.

Applicants' invention also resides in circuits and arrangements for reliably and accurately detecting the peak(s) of the oscillatory electrical signals.

Applicants' invention also resides in determining the preferable load conditions to be applied to the capacitive power generating circuit.

Applicants' invention also resides in circuitry for controlling the turn-on and turn-off of the switch selectively coupling the inductive power extracting circuit to the capacitive power generator.

BRIEF DESCRIPTION OF THE DRAWING

In the accompanying figures like reference characters denote like components.

FIGS. 12A, 12B, 12C, 12D, 12E, 12F, and 12F1 are diagrams illustrating various signal conditions associated with peak detection;

DETAILED DESCRIPTION OF THE INVENTION

Figure 2:
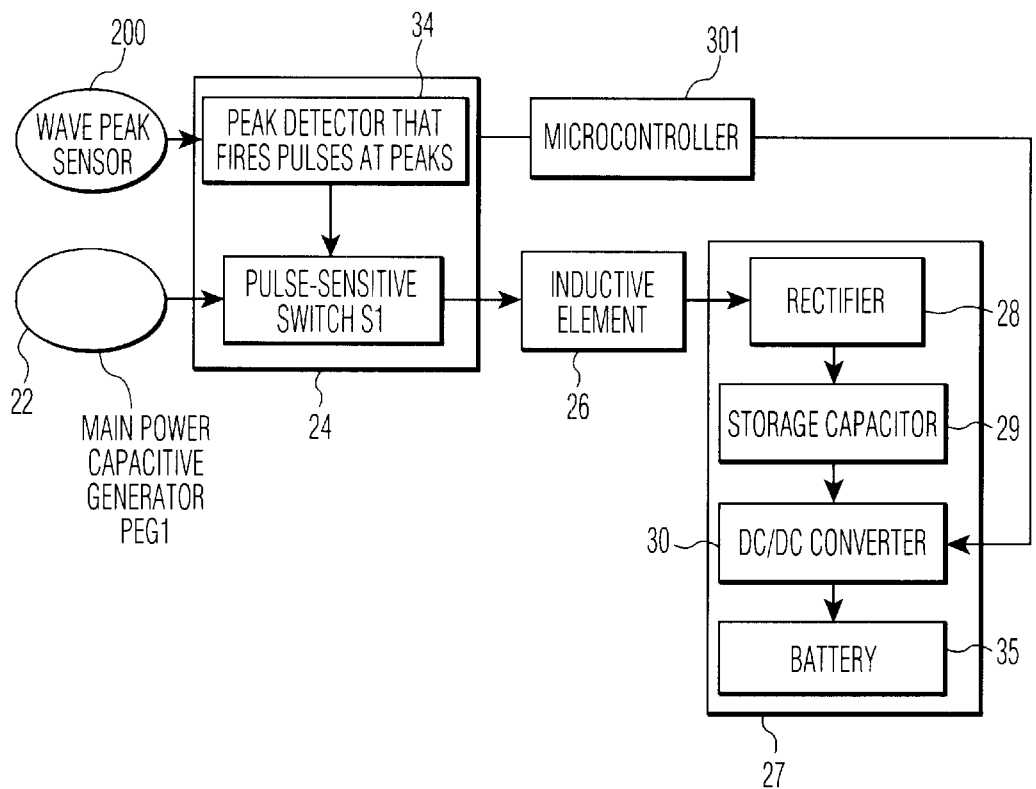
FIG. 2 is a block diagram of a system for generating power in accordance with the invention.

FIG. 2 includes a piezoelectric device 22, also referred to herein as PEG1, which may be placed in an environment where it is subject to mechanical stress. For purpose of illustration, assume that PEG1 is placed in an environment (e.g., an ocean, a river, a windmill) such that PEG1 is stressed and/or strained and produces an electrical signal whose amplitude and frequency varies as a function of the amplitude and frequency of the driving mechanical force (e.g., an ocean wave). PEG1 functions to collect energy imparted to it from the environment in which it is placed. PEG1 then supplies its collected energy to the system to which it is connected. In this example, it is assumed that PEG1 produces an oscillating voltage due to an oscillating mechanical force applied to it.

The piezoelectric device 22 is selectively coupled via a "smart" switch 24 to one end of an inductive circuit 26 whose other end is connected to load 27. Switch 24 is referred to as a "smart" switch because its turn-on (closure) and the length of time it is turned-on is carefully controlled. Smart switch 24 may include a switch S1 which may be an electronic switch or a relay contact or any like device providing a very low impedance connection for one signal condition (switch closure) and a very high impedance for another signal condition (switch open). The turn on and turn-off of smart switch 24 is controlled by a network 34 as further detailed below.

The inductive circuit 26 may include an inductor having an inductance, L. The value of the inductor is selected such that, when switch S1 is closed, the inductor 26 resonates with the capacitance Cp of piezoelectric device 22. In FIG. 2, the output side of inductor 26 is connected to a load 27 which includes a rectification circuit 28 whose output is connected to a storage capacitor 29 which is coupled to a DC/DC converter 30 which charges a battery 35 and regulates the charging of the battery.

Figure 3A:
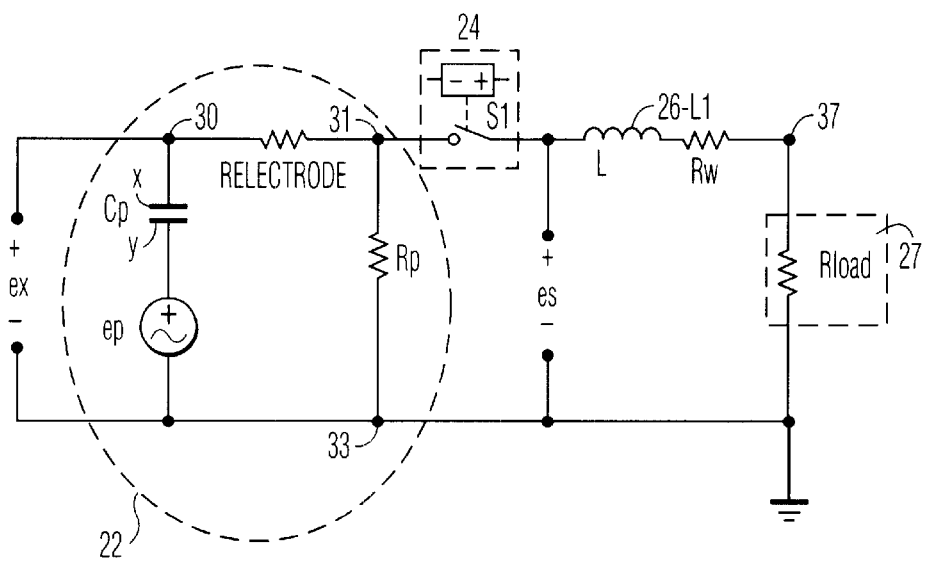
FIG. 3A is a simplified circuit schematic diagram of one embodiment of the invention.

Referring to FIG. 3A, which is a simplified equivalent circuit of the embodiment shown in FIG. 2, note that the piezoelectric device (PEG) may be represented by a voltage source, Ep, connected in series with a capacitor Cp between terminals 31 and 33 and a resistor Rp connected between terminals 31 and 33 so as to shunt the voltage source Ep in series with Cp. Resistor Rp represents an equivalent dielectric loss resistance of the piezoelectric material (PVDF) combined with an effective loss resulting from the phase difference between the strain and the voltage within a piezoelectric element under an oscillating mechanical force. Typically, the ohmic value of Rp is in the range of several megohms. In one embodiment capacitor Cp was determined to have a value of 0.45 microfarads. The PEG also includes an electrode resistance (Relectrode) shown connected between nodes 30 and 31. Voltage source Ep produces a voltage whose amplitude and frequency is a function of the amplitude and frequency of the mechanical driving force stressing it. The amplitude of Ep may vary over a wide range (e.g., 0 to 500 volts) and its frequency may typically vary over a range extending from 0 hz to several cycles per second.

One aspect of Applicants' invention is directed to extracting the power collected in the piezoelectric generator by selectively connecting an inductive element 26 in circuit with the electric power generator causing the transfer of energy from Cp into the inductive element and load at a resonant frequency which is primarily determined by the capacitance of Cp and the inductance (L) of the inductive element (L1 or 26). The value L of the inductive element 26 is selected such that the resonant frequency (fo) due to Cp and the inductive element 26 is significantly greater than the maximum "input" frequency (f1) of mechanical input force or that of the electrical signal produced by PEG1 in response to being stressed and/or strained.

In one embodiment, assuming a driving frequency of 2 Hz and a Cp of 0.45 microfarad, the resonant frequency was selected to be about 70 Hz, for which an inductor 26 having a value of approximately 11.6 Henrys was used to selectively connect PEG1 to the load 27. For the particular embodiment, the value of the series winding resistance (Rw) of inductor L1 was 65 ohms and the electrode resistance (Relectrode) of PEG1 was 100 ohms, whereby the "loop" series resistance (Rs) which represents the sum of Rw and Relectrode was 165 ohms.

In FIG. 3A the load 27 is represented by a resistor. However, it should be understood that, as shown in FIG. 2, the load 27 may be a complex load (including various resistive networks and/or inductive and/or capacitive elements). The load 27 as shown in FIG. 2 may also includie a bridge rectifier, 28, to convert the positive and negative power pulses generated by the circuit into a unidirectional power source, a temporary storage capacitor 29, a battery 35 to store the charge, and a DC/DC converter 30 to transfer the charge from the temporary storage capacitor 29 to battery 35 at the required voltage for charging the battery and storing the accumulated charge.

An important aspect of the invention is that: (a) the circuit formed during the closure of switch S1 has a resonant frequency (fo) primarily determined by the source capacitance Cp and the inductance of inductor 26 including any other series inductance along the loop [However, for ease of discussion, inductances other than that of inductor 26 have been neglected.]; (b) of is made to be significantly larger than f1, where f1 is the frequency of the input or driving signal (Ep) generated by PEG1; (c) the switch S1 is closed at the peak (positive and negative) of the input signal (Ep); and (d) switch S1 is closed for a period of time (Tc) approximately equal to one half of a cycle of the resonant frequency of, during which time a pulse of charge moves from the source PEG1 to the load. The switch S1 is closed for a period which is long enough to allow current to flow through the inductor until the current reaches zero. Switch S1 is then opened.

The opening and closing of switch S1 may be accomplished in several ways, as discussed below. One way is with a self-commutating ("self-quenching") switch which is turned-on when triggered and which turns itself off when the current reaches zero. Another way is to actively control the turn-on and turn-ff of switch S1.

Figure 4:
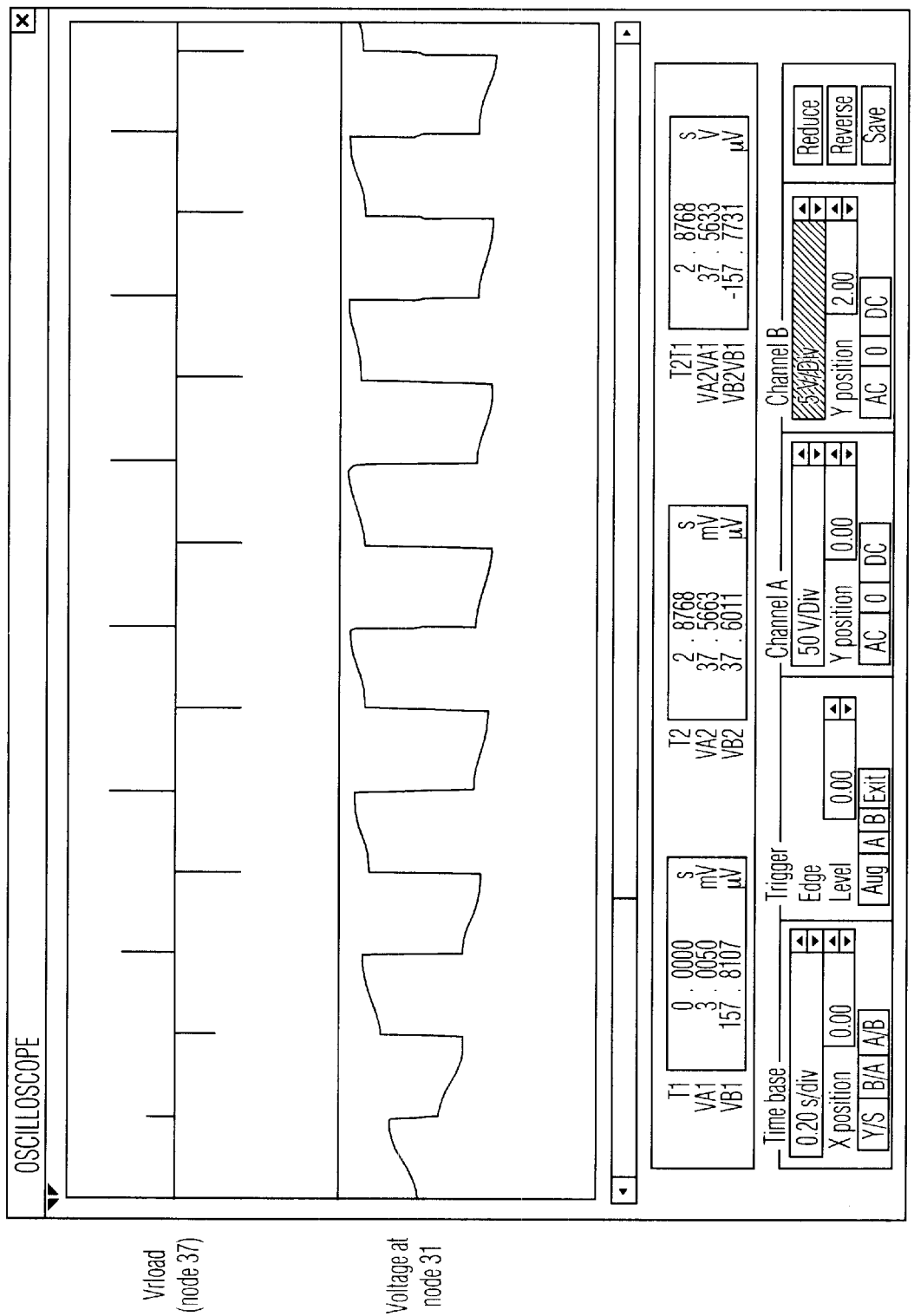
FIG. 4 is a waveform diagram illustrating various waveforms associated with the circuit of FIG. 3A.
Figure 5:
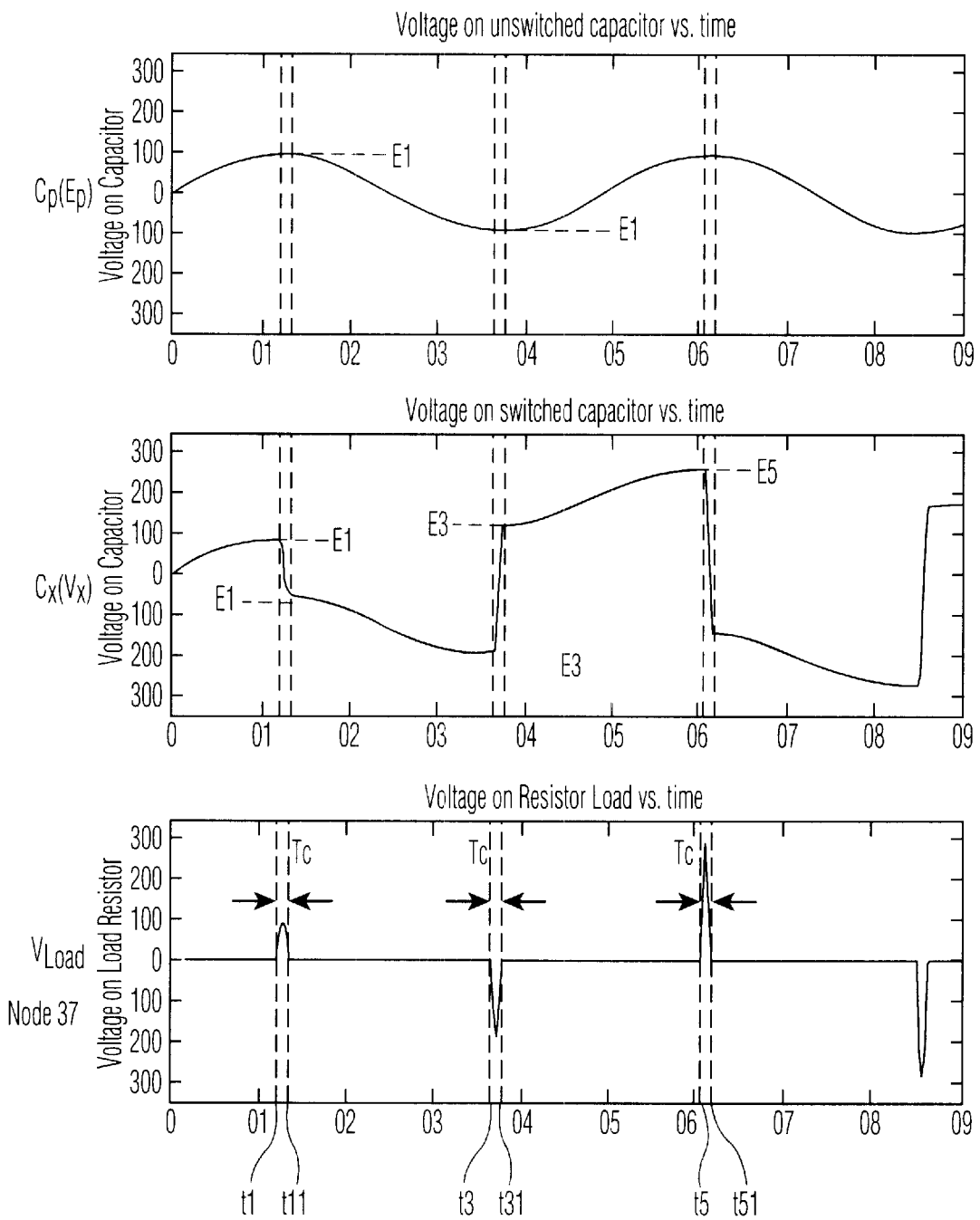
FIG. 5 is a waveform diagram of signals produced in circuits embodying the invention.

The operation of the circuit of FIG. 3A may be better explained with reference to the waveform diagrams shown in FIG. 4 and waveform A of FIG. 5 and assuming that: (a) the electrical signal generated by the PEG is a sinusoidal signal, (b) when Ep reaches a peak (negative or positive) at time t1, t3, t5, etc . . . , the switch S1 is triggered closed (i.e., turned-on). (c) When the current flowing through switch S1 reaches zero, or approximately zero, the switch is opened until the next peak/trough of the input signal. For ease of illustration, assume also that the driving frequency is 2 Hz and the resonant frequency is 70 Hz, whereby the period (Tc) is approximately 7 milliseconds. Referring to FIGS. 4 and 5 the operation of the circuit for turning on S1 at the positive and negative peaks of the input signal Ep may be described as follows:

1—circuit operation from time t0 to time t1: switch S1 is open and as Ep increases from 0 volts to a peak of E1, the voltage (Vx) at plate X of Cp also increases to a value of E1.

2—circuit operation from time t1 to t11: when switch S1 is closed at time t1, Vx goes from a value of E1 to a value of approximately (–)E1. That is, following the switch closure the resonant circuit (capacitor Cp and inductor L26) causes a reversal of the voltage at plate X of capacitor Cp during the first one-half cycle of the resonant circuit. Note that it is during this period that power is extracted from the PEG and transferred to the load circuit. The switch S1 remains closed as long as current passes through it. When the current through the switch S1 reaches zero, or approximately zero, switch S1 opens (or is actively opened) at time t11.

3—Circuit operation from time t11 to time t3: at time t11, with Vx near (–)E1, switch S1 opens. Then, after Ep goes from E1 to approximately (–)E1, from time t11 to time t3 the voltage on Vx follows that of Ep, and thus Vx goes from (–)E1 at time t11 to (–)3(E1) at time t3.

4—Circuit operation from time t3 to time t31: At time t3 with Ep at (–)E1 and Vx at (–)3(E1), switch S1 is closed at time t3, forming the series resonant circuit which includes Cp and L26. The resonant circuit causes a reversal in the polarity of the voltage at plate X of Cp with the voltage Vx going from (–)3E1 to nearly +3E1. From time t3 to time t31, the charge is pushed through the load. At time t31, after a pulse of charge has moved through the switch and the current in the switch returns to zero, switch S1 opens or is opened. As before, it is during the time period of t3 to t31 that power is extracted form the PEG and transferred to the load circuit.

5—Circuit operation from time t31 until time t5: as Ep goes from –E1 at time t31 to +E1 at time t5, Vx follows from a value of +3E1 to a value of +5E1.

6—The operation described above is repeated at each positive peak and trough (valley or negative peak) of the input signal. However, instead of building indefinitely, the voltage of Vx approaches a steady-state value, when electrical losses in the resonant system, including power lost in the load, prevent the voltage of Vx from reversing itself completely. Consequently, the amplitude of the signal at Vx reaches a quiescent value as shown in FIGS. 4, 5, 7 and 8. When the system reaches the steady state, the power extracted in the form of resonant pulses matches the power supplied by the input power source, PEG1. When the resonant circuit is not overdamped and the voltage at Vx is allowed to build up, then the magnitude of the steady state voltage at Vx will be comparatively large compared to that of Ep.

7—In circuits embodying the invention, the power extraction occurs for a time Tc; where Tc is equal to ½fo, and where fo is the resonant frequency of the series loop with the switch closed. For the simplified circuit showing PEG1 in series with a switch an inductive element and a load: fo, is approximately equal to $\frac{1}{2}\pi(LCp)^{0.5}$ and the switch is closed for a period of time which is approximately equal to Tc=$\pi(LCp)^{0.5}$.

8—Referring to the waveform for Vload in FIG. 5, note that the current pulses through the resistive element result in pulses for a time period Tc following each peak(e.g., at times t1, t3 and t5) of the input sinusoidal wave. For each pulse, the current rises from zero increases to its maximum value and then returns to zero a time Tc after each switch closure corresponding to a peak.

There is a trade-off between voltage build-up and power extraction, as there is in any resonant system. Consequently, there is an optimum load for transferring the maximum power using this method. An approximation of this optimum and maximum can be derived mathematically or computed empirically.

Theory of Operation

[Note that certain reasonable and realistic approximations have been made in the mathematical analysis below]

Figure 6:
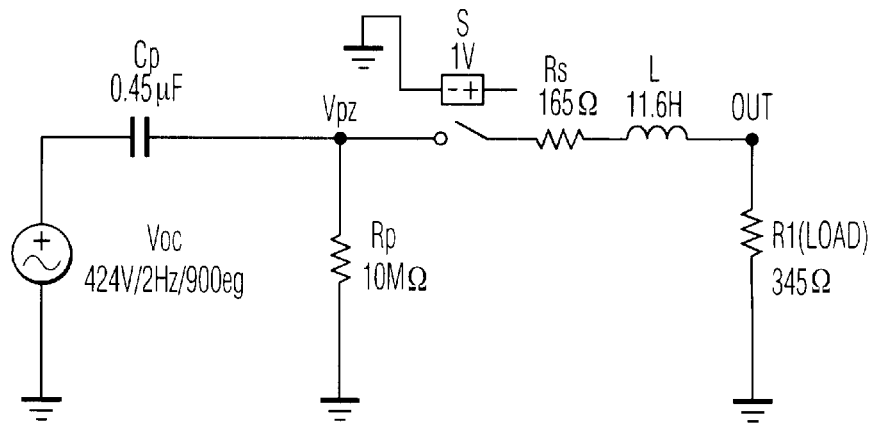
FIG. 6 is a circuit diagram showing selected values for certain components.

Circuit operation is best described by referring to the schematic shown in FIG. 6. In FIG. 6, $R_P$ represents an equivalent dielectric loss resistance of the PVDF and $R_S$ a series loss term equal to the combined effect of coil winding resistance and the electrode resistance of the piezoelectric element. Thus, $R_S=R_W+R_{electrode}$. In one embodiment, the 424 volt rms voltage source and 0.45 $\mu$F capacitance correspond to 1 electroded piezoelectric film being strained at ±1%. The parallel loss resistance $R_P$ of 10 MΩ is based on a tan δ of ≈2%. In the embodiment of FIG. 6 the inductor was selected to have a value of 11.6 H and had a winding resistance of 65 Ω. The $R_{electrode}$ was assumed to equal 100 ohms, whereby Rs was equal to 165 Ω. As discussed below a value of $R_L$ equal to 345 Ω was selected, since for the circuit of FIG. 6 a value of $R_L$=345 ohms is the optimum for maximum power transfer with the parameters shown.

For purpose of illustration, assume Ep to provide a sinusoidal input to the piezoelectric element with an input frequency $f_{IN}$=2 Hz, and further assume that intelligent switch S1 closes at the positive and negative peaks of the input signal Ep. The switch opens or is opened when the current passing through the inductor is equal to zero or approximately equal to zero. In the case where the impedance of the source is much greater than the impedance of the load, a quasi-sinusoidal current pulse, with a duration of one half cycle of the resonant period of the L-Cp network, moves through the inductor to the load. The switch closure time may then be approximated as Tc=$\pi$ (LCp)$^{0.5}$ which in this embodiment would be 7.18 msecs.

Given an initial value $V_N$ across Cp, the voltage during the closure interval is $$V_C(t)=V_{N\,exp\,(-\omega_0 t/(2Q_L))}\cos(\omega_0 t) \qquad (1)$$

where $\omega_0=1/(LCp)^{0.5}$ and $Q_L=\omega_0 L/(R_L+R_S)=(L/Cp)^{0.5}/(R_L+R_S)=R_0/(R_L+R_S)$ During this same interval, the current through the inductor L and the load $R_L$ is $$i_L(t)\approx V_{N/R0}\sin((\omega_0 t) \qquad (2)$$

At t=Tc, the switch S opens with $v_C$(Tc)=−Vi exp(−$\pi$/(2$Q_L$))=−aVi (a ≈1) and $i_L$(Tc)=0.

with a defined as $$a\equiv exp(-\pi/(2Q_L)) \qquad (3)$$

After the switch is opened, the switch remains open until the next peak (a negative peak) occurs. During this period, $V_C$ will continue to charge (more negatively) due to the charge produced by the piezo element under the applied strain. The waveform here is $$V_C(t)=V_P\cos(\omega_{IN}t)-(a\,V_N+V_P)\exp(-t/\tau) \qquad (4)$$

where $\tau=R_P C_P$ represents the dielectric loss time constant of the piezo and $V_P$ is the peak open circuit voltage.

At the next peak, S closes for the same period Tc and produces the same behavior except that (Vi)+ is now a much higher value. Just prior to this next switch closure at t=1/(2$f_{IN}$), $\omega_{IN}$t=$\pi$, $V_C$ reaches a value $V_{N+1}$ which is $$V_{N+1}=-(V_P(1+b)+abV_N) \qquad (5)$$

and b≡exp(−1/(2 $f_{IN}\tau$))=exp(−$\pi$/$Q_C$), Qc=2$\pi$ $f_{IN}\tau$=1/tan $\delta$. This process repeats every half cycle (with a sign change) until steady state is reached when the energy added by the piezo device is offset by the energy transferred to the load $R_L$ plus losses in the electrodes, inductor, and PVDF dielectric. Using Eqn. (5) recursively predicts the build up in voltage as a function of the number of half cycles of the input. It can be shown that the build up time constant is approximately $Q_L$ cycles. The steady state voltage is the parameter of interest as it determines the steady state power transferred to the load. This is obtained by setting $V_{N+1}$=−$V_N$ in Eqn. (5) which yields $$(V_C)_{SS}=V_P(1+b)/(1-ab) \qquad (6)$$

This peak voltage will produce a half sine wave current pulse into the load having width $T_C$ and peak amplitude $$(I_L)_{MAX}=(V_C)_{SS}/R_0 \qquad (7)$$

Finally, the average power output is obtained from Eqn. (7) as $$P_{OUT}=((I_L)_{MAX})^2 R_L T_C f_{IN} \qquad (8)$$

Figure 7:
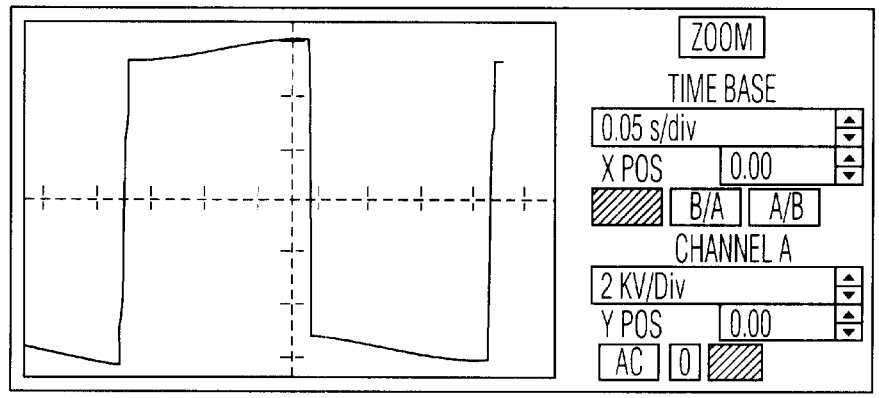
FIG. 7 is a waveform of a steady state voltage produced in circuits embodying the invention.
Figure 8:
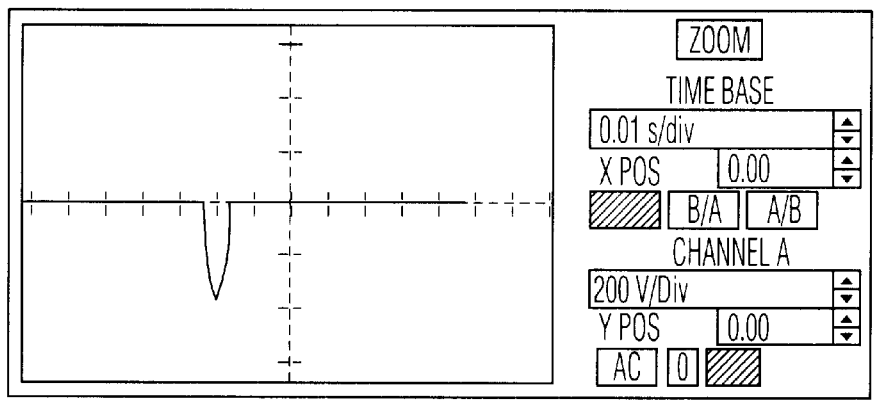
FIG. 8 is a waveform diagram of steady state load current pulses produced in circuits embodying the invention.

The high-voltage build up across the reactive elements proportional to Q is typical of a resonant circuit. The significant aspect of this pulsed approach is that the resonant frequency and input frequency are independent so that realistic component values are possible, despite very low input frequencies. Shown in FIGS. 7 and 8 are the steady state voltage and load current waveforms produced by a computerized software circuit program (SPICE) simulation of the circuit of FIG. 6.

3. Optimum Power Transfer

There is an optimum value for $R_L$ which maximizes power output. This can be seen by manipulation of the equations 6–8. First, recognize that the parameters a and b as defined previously are both ≈1 for large $Q_L$ and $Q_C$ (>5). Thus, Eq. (6) can be approximated by $$(V_C)_{SS}\approx 2V_P/\pi(1/(2Q_L)+1/(Q_C))=4V_P Q_L Q_C/\pi(2Q_L+Q_C) \qquad (9)$$

and the power output can be rewritten as $$P_{OUT}=(V_{CSS})^2 T_C f_{IN} R_L/R_0^2\approx 16 C_P V_P^2 Q_L^2 Q_C^2 f_{IN} R_L/(\pi R_0(2Q_L+Q_C)^2) \qquad (10)$$

Recalling that the mechanical power input is $$P_{IN}=C_P V_P^2 f_{IN}/(2k^2) \qquad (11)$$

($k^2$ =electromechanical coupling factor=$d_{21}^2$ Y/$\epsilon$) the mechanical to electrical power conversion efficiency $P_{OUT}/P_{IN}$ is then $$\eta=(32k^2/\pi R_0)*((Q_L^2 Q_C^2/(2Q_L+Q_C)^2)*R_L) \qquad (12)$$

Substituting for $Q_L=R_0/(R_L+R_S)$, and maximizing with respect to $R_L$ $$(R_L)_{OPT}=R_S+(2R_0/Q_C) \qquad (13a)$$

$$(Q_L)_{OPT}=R_0/2(R_S+R_0/Q_C) \qquad (13b)$$

Incorporation of the above into Eqn. (12) gives the maximum value of conversion efficiency $$\eta_{MAX}=8k^2 R_0/(\pi(R_S+2R_0/Q_C)) \qquad (14)$$

Applicants' invention thus includes the recognition that there is an optimum value of resistance, (R$L$)$_{OPT}$, and that this value of resistance is a function of: (a) Rs=$R_W$+$R_{electrode}$ and (b) a function of 2Ro/Qc where Ro is equal to (L/Cp)$^{0.5}$ and Qc is equal Qc=2$\pi$ $f_{IN}\tau$ and $\tau$ is equal to RpCp.

Figure 9:
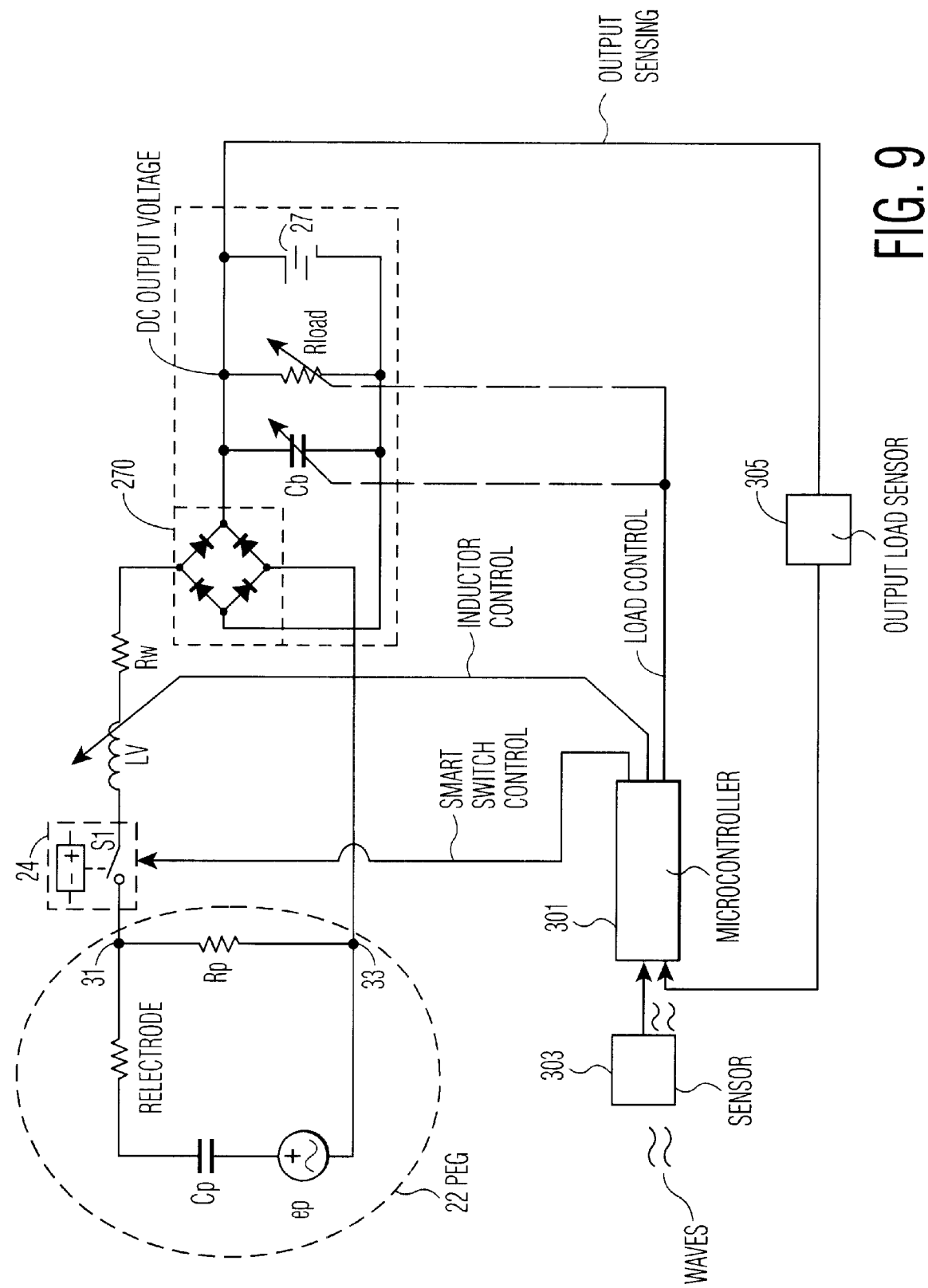
FIG. 9 is a simplified circuit diagram of another circuit embodying the invention.

Applicants further recognized that since (R$_L$)$_{OPT}$ may vary as a function of a frequency of the input signal, the frequency of the input signal may be monitored and the value of (R$_L$)$_{OPT}$ may be varied as a function of frequency to keep (R$_L$)$_{OPT}$ optimized. As discussed below this may be accomplished by applying (via switches) more or less load to the system. That is, the average value of the load may be changed by controlling the on to off period during which the load is applied to the system. This is illustrated in FIG. 2 where the wave peak sensor 200 responsive to the amplitude and frequency of input mechanical stresses and strains supplies signals to peak detector 34 which supplies corresponding signals to microcontroller 301 which can then control DC/DC converter 30. Similarly, FIG. 9 shows that a sensor 303 responsive to the amplitude and frequency of input mechanical stresses and strains (e.g., form ocean waves) supplies signals to a microcontroller 301 which is programmed to control one or more of the subsystem components, that is: (a) switch S1; (b) the inductance of L1; and (c) various components of the load (e.g., the load capacitance and the resistive load). Note that FIG. 9 also illustrates that the output may be monitored and signals may be supplied to an output load sensor 305 whose output is then fed to the microcontroller which again may be programmed to take whatever action is needed to optimize the response of the system.

Type of Load May Be Varied

While the above theory of operation applies to the purely resistive load case, applicants have found that the switched resonant power extraction circuit need not be restricted to a purely resistive load. In fact, a parallel resistive-capacitive load may be preferable in some cases where the desired output is a DC voltage rather than a pulse. This can be accomplished using a circuit of the type shown in FIG. 9. In FIG. 9 a full wave rectifier 270 is used to convert the AC signal produced in the series loop (PEG22, switch S1, inductor L1 and the load) to a DC output voltage which may be stored in a capacitor and/or a battery and/or to drive the load illustrated as RLOAD, which may be, in practice, a complex load.

Changing Location of Switch

Figure 3B:
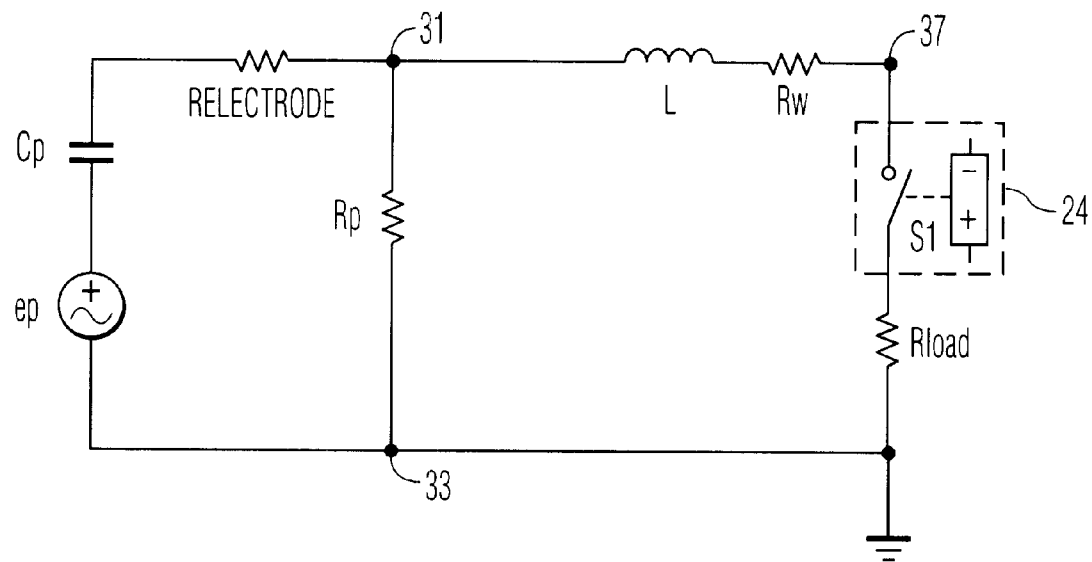
FIGS. 3B and 3C are simplified schematic diagrams showing different embodiments of the invention.
Figure 3C:
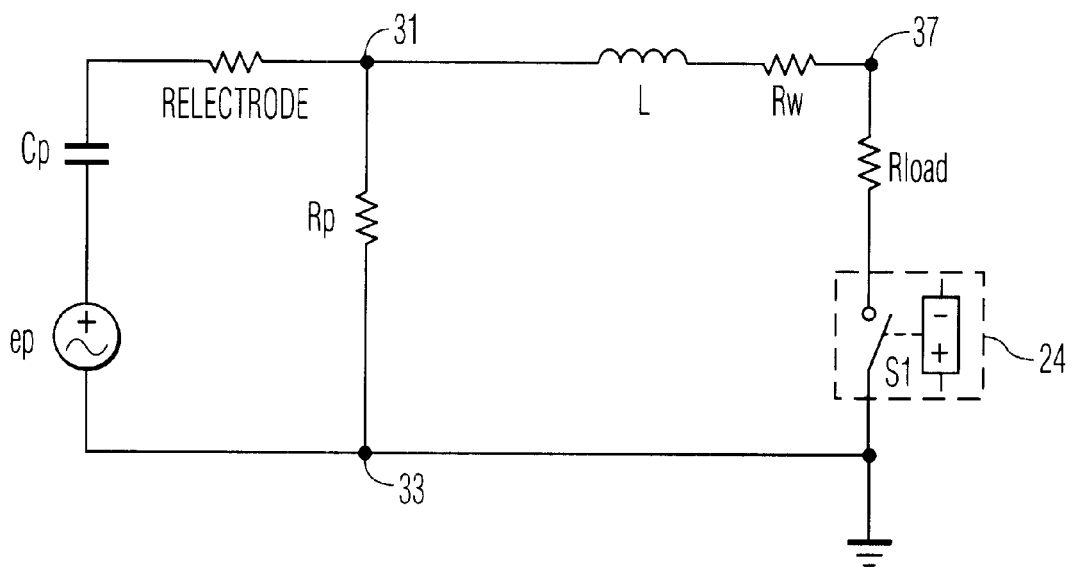

In addition to varying the impedance characteristics of the load, it is also possible to rearrange the order of the circuit elements which are connected in series. In FIGS. 3A, and 6 the switch S1 is located between PEG (capacitor Cp) and the inductor L. However, the location of switch S1 can be moved to another location along the series path of the resonant circuit. For instance, the switch S1 can be placed between the inductor and the load as in FIG. 3B. Alternatively, the switch S1 may be located between the ground return terminal and the load RL, as in FIG. 3C. Moving the switch from between the inductor L and the piezoelectric device PEG1 as shown in FIG. 3A to another position on the load side of the inductor as shown in FIG. 3B or in the bottom leg of the load as shown in FIG. 3C presents certain advantages in the turn on and turn off voltages needed to operate the switch. This is particularly so, where the switch is formed using a combination of transistors which can conduct bi-directionally 9 e.g., MOSFETs) as illustrated in FIG. 3D.

Figure 3D:
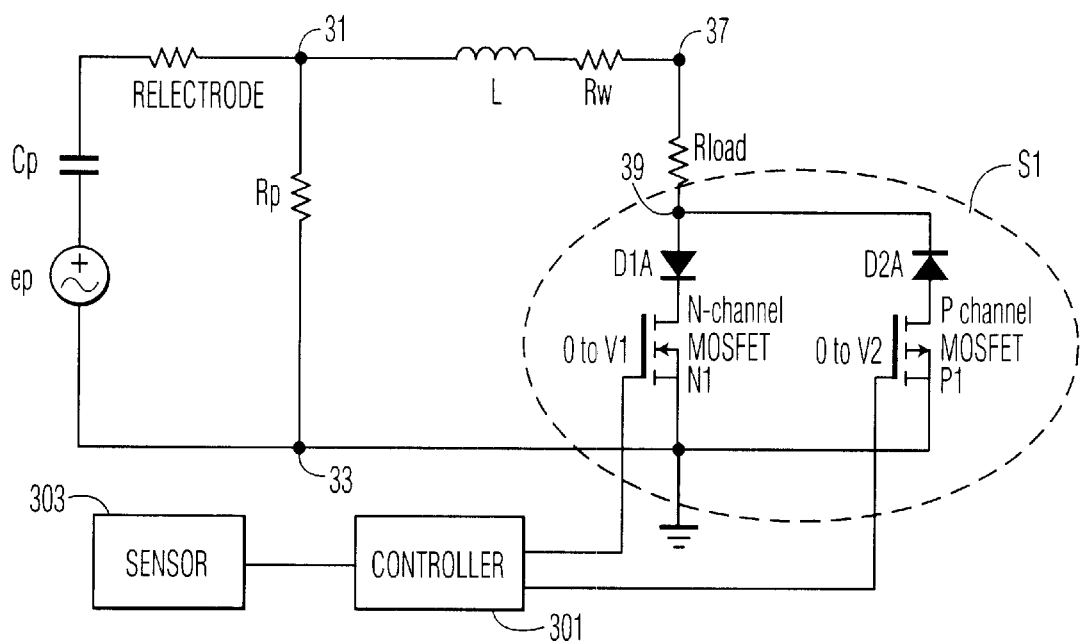
FIG. 3D is a simplified schematic diagram of a circuit embodying the invention using MOSFET switches.

The switching network of FIG. 3D includes a smart switch, S1, connected between terminal 39 and ground return 33. The smart switch includes two parallel paths connected between terminals 39 and 33 to control conduction of current through the load for a positive going input voltage and for negative going input voltage. One path includes a diode D1A connected in series with the conduction path of an n-channel MOSFET, N1, whose source and substrate are connected to node 33. The other path includes a diode D2A connected in series with the conduction path of a p-channel MOSFET, P1, whose source and substrate are connected to node 33.

N1 can be turned on (when Ep is highly positive) by the application of a relatively small value (e.g., 3–10 volts) of a positive going voltage to the gate of N1. N1 stops conducting when the current through the inductor goes to zero. Alternatively, N1 can be turned-off by clamping the gate of N1 to terminal 33 (or by the application of a small negative voltage to the gate of N1). Note that when Ep goes positive conduction through P1 is blocked by diode D2A.

P1 can be turned on (when Ep is highly negative) by the application of a relatively small value (e.g., 3–10 volts) of a negative going voltage to the gate of P1. P1 stops conducting when the current through the inductor goes to zero. Alternatively, P1 can be turned-off by clamping the gate of P1 to terminal 33 (or by the application of a small positive voltage to the gate of P1). Note that when Ep goes positive conduction through N1 is blocked by diode D1A.

The location of the smart switch between ground and the load 27 as shown in FIG. 3D illustrates the importance of locating the switch at certain points along the loop to enable the transistors to be turned on and off with low gate to source voltages ($V_{GS}$). It should also be noted that Diodes D1A and D2A ensure that only one of the two "parallel" conduction paths is conducting at any one time. In the absence of Diodes D1A and D2A the transistors (N1 and/or P1) would be driven into conduction (i.e., N1 when Ep goes negative, and P1 when Ep goes positive) during the wrong phase of the conduction cycles. Note that in FIG. 3D the switch S1 may be controlled by a controller 301 which is responsive to signals form a sensor 303 which senses the frequency and/or the peaks and/or the amplitude of the naturally recurring force applied to the transducer (PEG 22). FIG. 3D illustrates that sensor 303 can supply signals to controller 301 which can then be used to control the turn on and turn off of switch S1 by supplying turn on and turn off signals to the gate electrodes of transistors N1 and P1. Thus, the controller 301 determines when the switch is to be turned on (e.g., positive signal to the gate of N1 for positive going Ep and negative going signal to the gate of P1 for negative going Ep) and when the switch is to be turned off by applying a turn off signal to the gates of N1 and/or P1.

Properties of the Switch

Finding a switch that can operate in a switched resonant circuit may be difficult for several reasons. First, it must have a very high impedance in the off state, and a very low impedance in the on state. Second, it may be required to block significantly large positive and negative voltages. Third, it may be required to handle significantly large pulsed currents. Fourth, it must have a turn-on and turn-off time that is substantially shorter than the expected time of switch closure. Fifth, it may be required to handle current in both directions. Sixth, it must be able to be closed precisely by the controller. When the term "switch" is used, it refers to a device which performs the function of a switch, and the device itself may be composed of several different components.

Applicants have examined several circuit designs which address the requirements of a switch. Any type of switch can work with varying degrees of success. In a mechanical design, the switch in a switched resonant circuit may be a hydraulic valve. Alternatively, the switch may be a relay contact driven by a relay coil with signals from a control or peak detector, or any other suitable control circuit. However, there may be a problem using relays in high speed operation. For electrical circuit designs for use with the previously described piezo sources, a solid state electrical device presents certain advantages. Under most conditions, to achieve high impedance with short turn-on and turn-off time periods, MOSFET transistors work well (as already shown in FIG. 3D).

Figure 10:
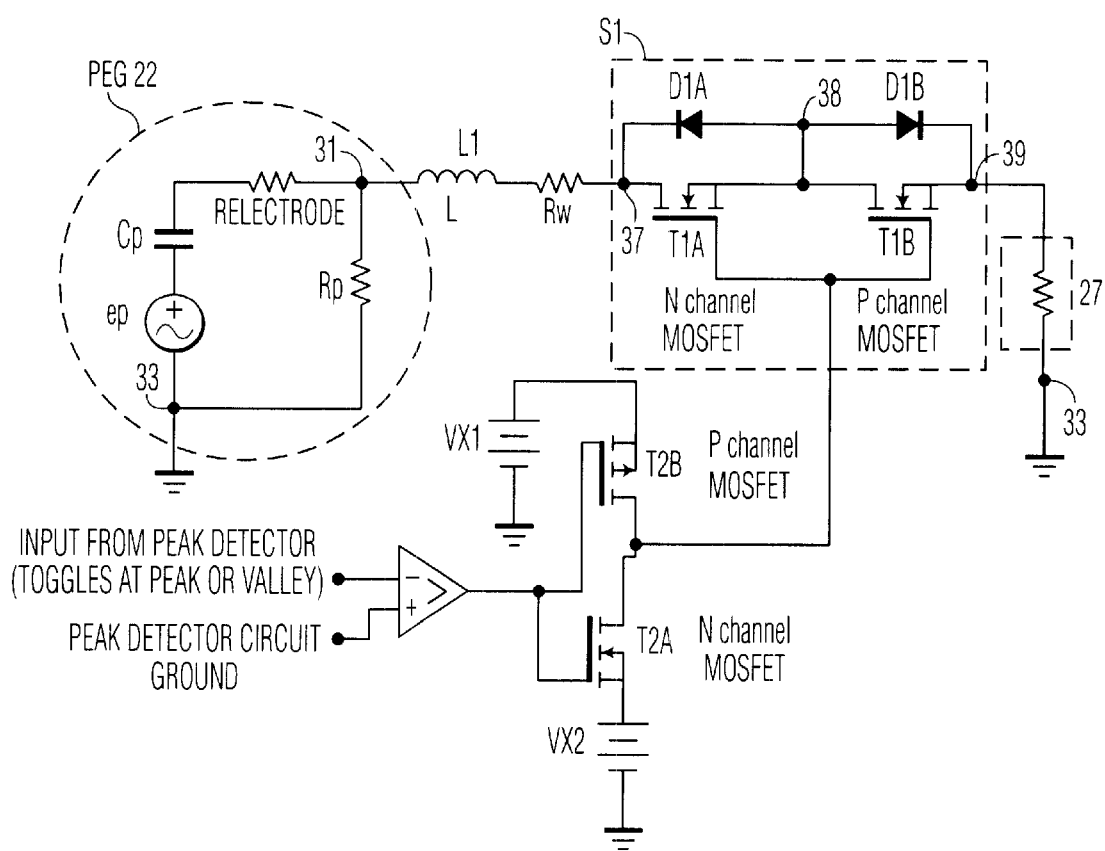
FIG. 10 is a simplified circuit diagram showing a switching circuit in w accordance with the invention.

Another embodiment of a circuit using a smart switch including MOSFETs and diodes is shown in FIG. 10. Note that in the circuit of FIG. 3D, switch S1 was turned on by a controller and turned off again by the same controller at time Tc after S1 was turned on and the current through the loop is zero, or close to zero. However, it is possible to arrange a circuit such that the controller turns on switch S1, but S1 shuts itself off when the current passing through it and inductor L1 reaches zero. This can be accomplished by placing diodes in series with switching transistors, as shown in FIG. 10.

In FIG. 10, PEG 22 is connected to one side of the inductor L1 and the other side of the inductor is connected to the load 27 via a smart switch. The smart switch of FIG. 10, like the smart switch of FIG. 3D, includes a first path for conducting current through the load when Ep is positive and another path for conducting current through the load when Ep is negative. The one path includes an N channel MOSFET T1A having its conduction path connected between terminal 37 and a node 38 and a diode D1B having its anode connected to node 38 and its cathode connected to terminal 39. The other path includes a P channel MOSFET T1B having its conduction path connected between terminal 39 and node 38 and a diode D1A having its anode connected to node 38 and its cathode connected to terminal 37. In FIG. 10 a CMOS logic inverter comprised of MOSFETs T1B and T2B is used to bias the gates of MOSFETs T1A and T1B. When the voltage across Cp is large and positive, the current is blocked by the diode D1A and T1A, whose gate is in the off state biased at VX2 Volts; where VX2 may be in the range of −5 to −100 volts, or more, as described below. Though T1B is in the "on" state, it does not conduct electricity because there is no free path for the charges to move past the T1A gate. When Ep across Cp reaches a peak positive voltage, a signal from the peak detector toggles T2A and T2B, which in turn causes the gate voltages of T1A and T2B to go from VX2 Volts to+VX1 Volts; where VX1 volts may be in the range of 5 volts to 100 volts, or more. With T1A turned-on charges move from Cp through the T1A through diode D1B through $R_{load}$, to ground, causing a voltage and current pulse seen by the components of the smart switch. However, once the voltage pulse reaches zero, charge cannot move back through T1A because the diode D1B prevents current from passing back through that path. Conduction then ceases.

When Ep across Cp reaches its most negative peak, T2A and T2B toggle again, causing VX2 Volts to be placed on the gates of T1A and T1B. This closes T1A and opens T1B. Thus, negative charges move through D1A and pass through T1B and $R_{load}$ until the negative current and voltage through T1B equal zero. After the "negative" current goes to zero, current can not move in the opposite direction through D1A, and thus the smart switch S1 is effectively open. Thus, every time a toggle occurs, reversing the conducting states of T1A and T1B, they only conduct current in one direction for a period of time until the resonant circuit tries to draw current in the reverse direction. When it does, the diodes block the current reversal, effectively opening the switch. Using this method, it is possible to open and close the smart switch controllably and reliably.

It should be noted that as long as switch S1 is closed at each peak, and stays closed until the current through S1 goes to, or close to, zero and the switch then opens, or is opened, any type of load may be used so long as a resonant circuit is formed whose resonant frequency is significantly higher than the driving source frequency.

Figure 11:
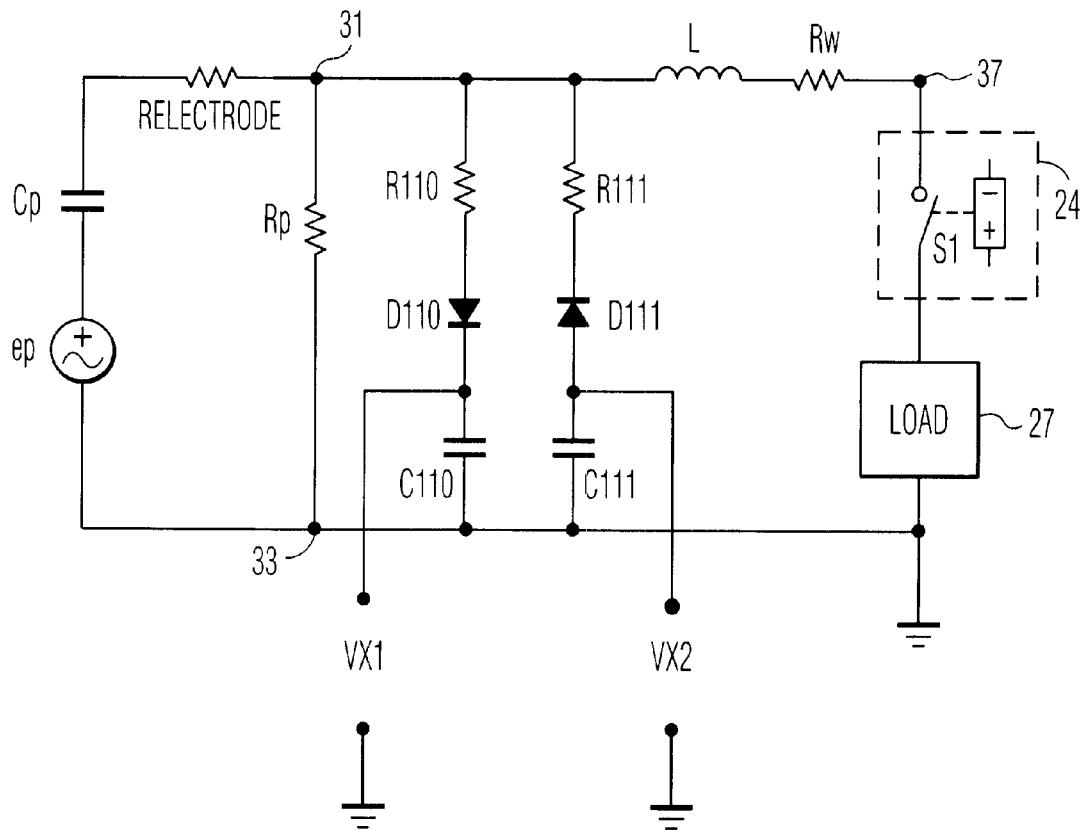
FIG. 11 is a simplified rectifying circuit for use in circuits embodying the invention.

It should be appreciated that in the circuit of FIG. 10, transistors T1A and T1B are operated in the source follower mode. Hence the voltage developed across the load may be limited by the gate voltage applied to T1A and T1B. Accordingly, in systems embodying the invention a rectifying network 110 of the type shown in FIG. 11 may be used to generate a relatively large positive voltage (e.g., VX1) and a relatively large negative voltage (e.g., VX2). The network 110 may be connected at any point along the loop at which some of the high positive and negative transient voltages are generated. Thus, for a positive going transient a current flows through resistor R110 and diode D110 to charge capacitor C110 to produce VX1. Similarly, for a negative going transient a current flows through resistor R111 and diode D111 to charge capacitor C111 to produce VX2. An important aspect of generating the voltages applied to T1A and T1B in this manner enables the positive turn-on and subsequent turn-off of the switching transistors.

Peak Detection Schemes

Figure 12A:
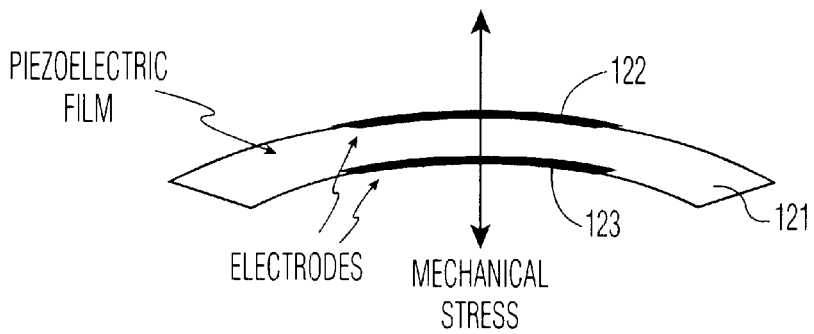
Figure 12B:
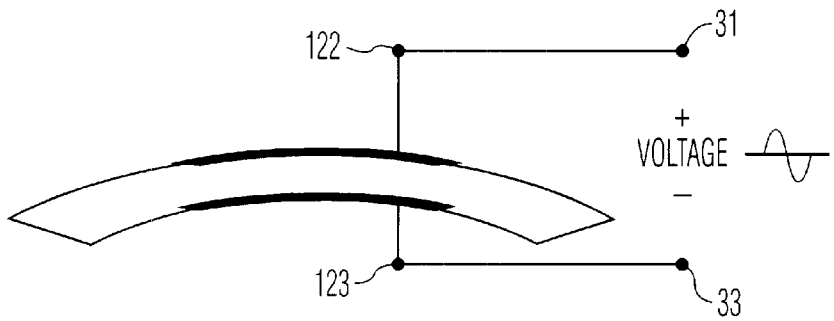
Figure 12C:
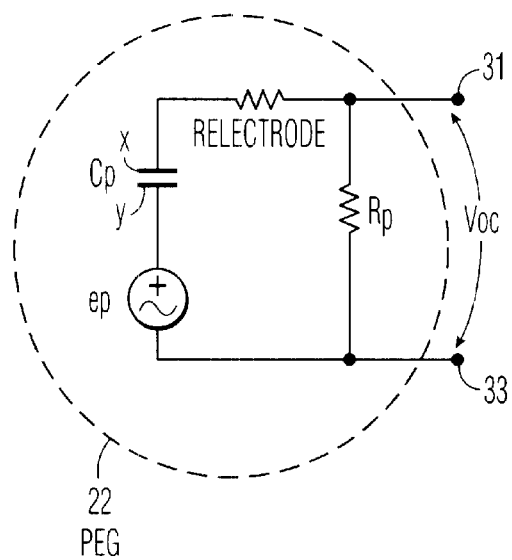
Figure 12D:
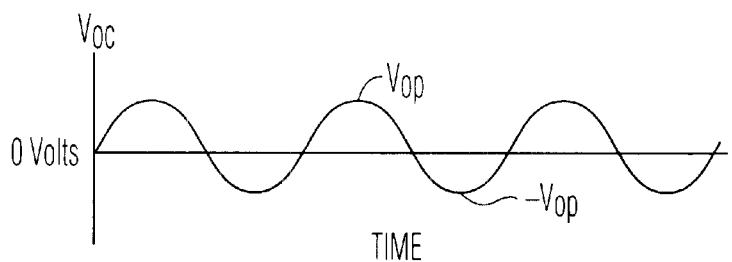
Figure 12E:
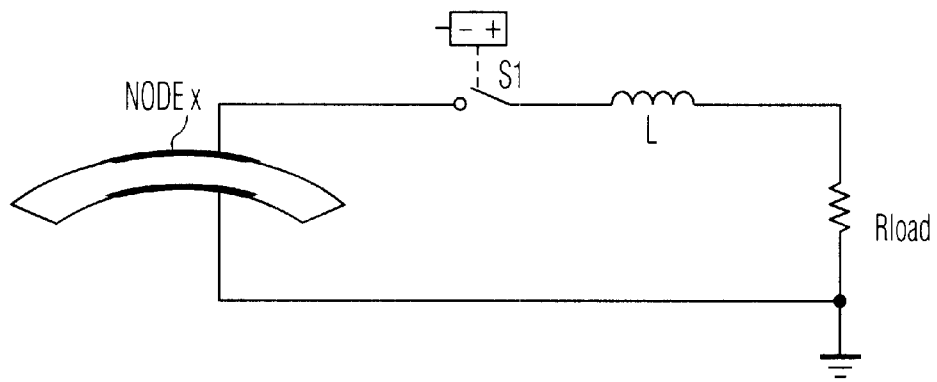
Figure 12F:
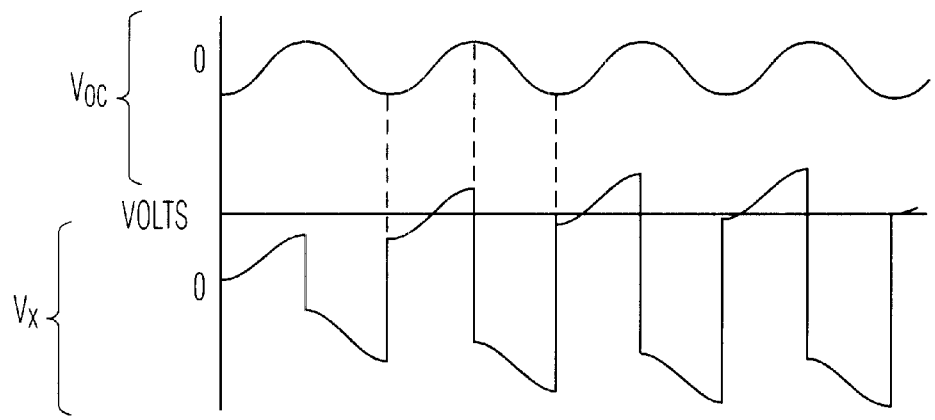

Referring to FIG. 12A there is shown a segment of a piezoelectric material 121 with electrodes 122 and 123. The piezoelectric material 121 is subjected to naturally recurring forces which cause the material to be stressed resulting in the generation of an oscillating voltage across the electrodes 122 and 123. The piezoelectric material 121 with electrodes 122 and 123 may be represented as a capacitor with AC signals being generated by the piezo device as shown in FIG. 12B. For ease of discussion it has been assumed that unloaded or open circuit voltage (Voc) produced across electrodes 122 and 123, as shown in FIG. 12C, may be sinusoidal in nature oscillating between a positive peak value +Vop and a negative peak value (−)Vop, as shown in FIG. 12D. As discussed above, and as shown in FIG. 12E in order to optimize the power transfer from the PEG 22, it is desirable that a switch S1 be closed at each peak (+Vop and −Vop) of the PEG output. However, when the switch S1 is closed forming a highly desirable resonant circuit, the voltage at node X is subjected to sharp positive and negative going transients as shown in FIG. 12F. The sharp transients and large voltage levels compared to the maximum input amplitude (Vop) make it difficult to design a sensitive noise free detector. Noise and phase shifting are the causes of basic problems (discussed below) making it difficult to detect the peaks.

Figure 1:
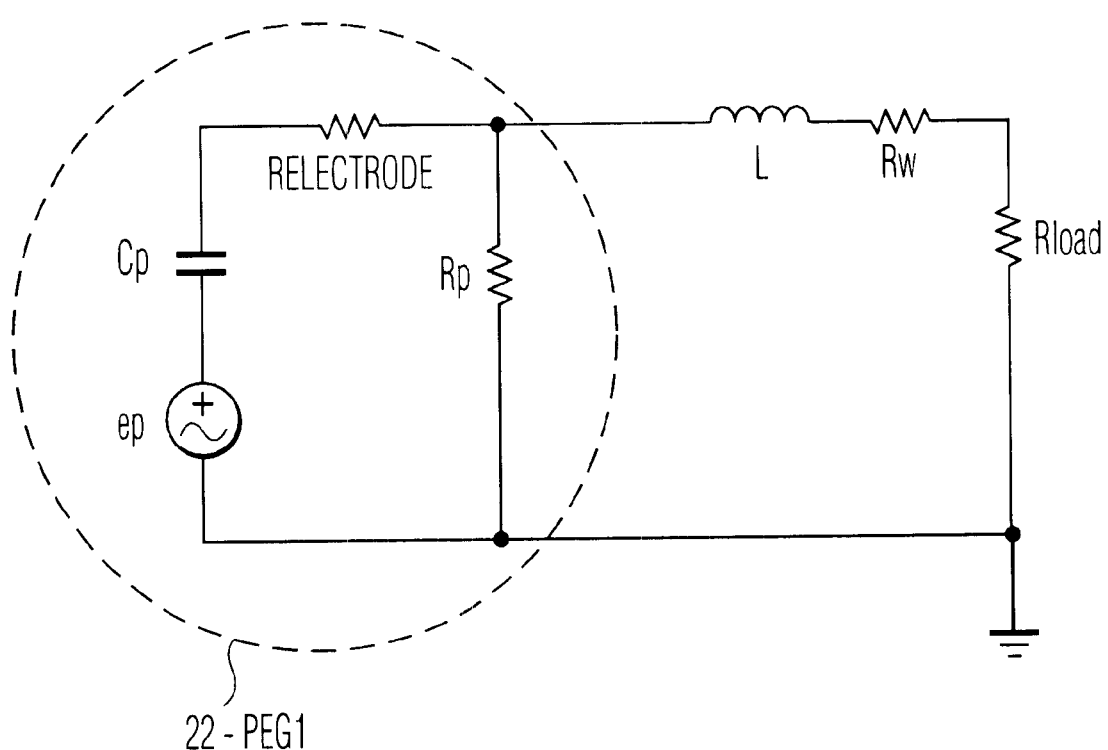
FIG. 1 is a simplified circuit diagram of a prior art system using piezoelectric devices to generate electric power.

The problem of sensing the occurrence of the peaks is rendered more difficult by the generation of "false" peaks and bottoms as shown in FIG. 12F1. Consequently, ascertaining the peak values and when to close the switch S1 is a significant problem.

Another major difficulty with a switched resonant circuit is detecting the peaks and troughs accurately to close (and open) the switch at the appropriate time. First, when using capacitive devices, such as PEG 22, there is often a lag between the driving mechanical source (e.g., the naturally recurring force applied to the PEG 22) and its electrical output, as in the case of piezoelectric materials. Consequently, when switching the capacitive devices in a resonating circuit, this phase shift can cause a voltage "snap back" to occur slightly after a switch is completed, causing a false peak or bottom.

Also, the voltage build-up on the capacitor demands that one sense the voltage for peak detection over a much wider range, thereby reducing the sensitivity of the detector.

Figure 12G:
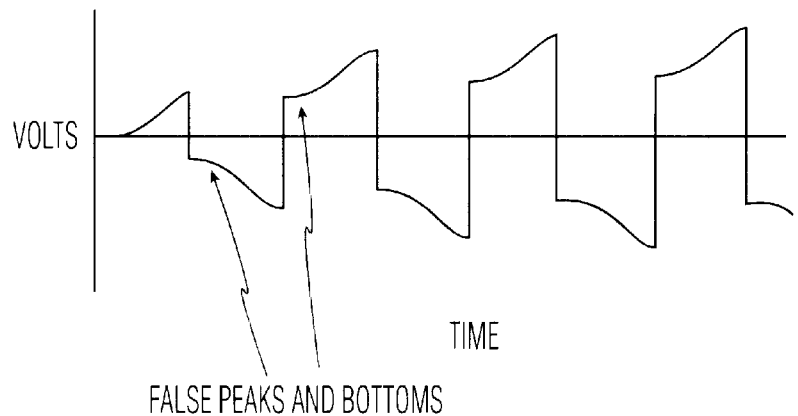
FIGS. 12G and 12H are diagrams illustrating a peak detection scheme embodying the invention.
Figure 12G:
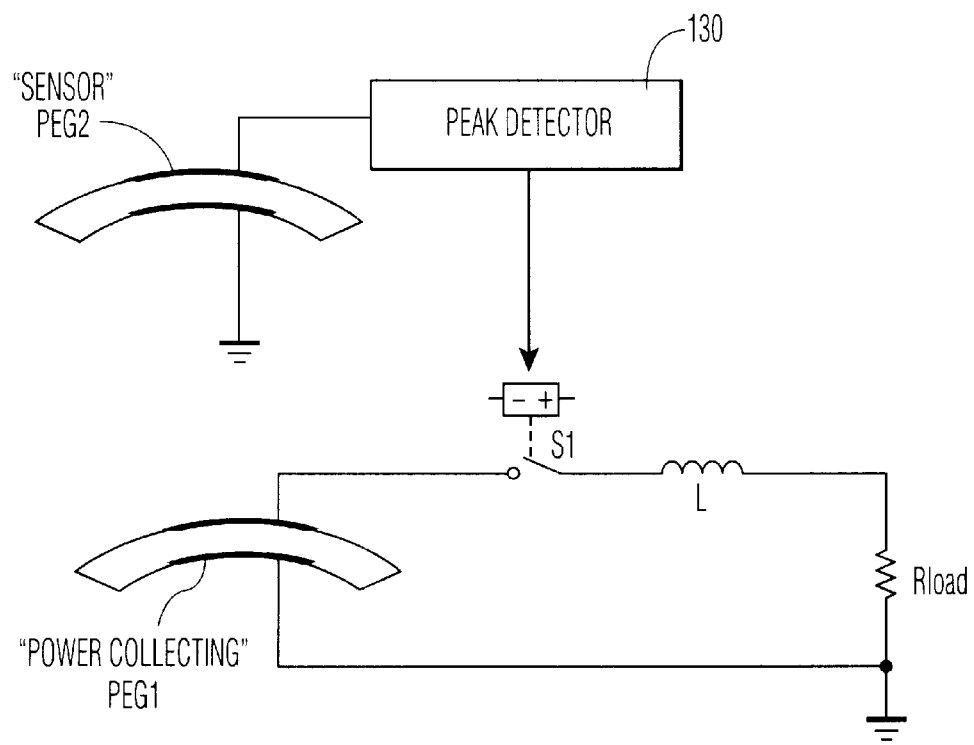

The problem of detecting the peaks more accurately may be resolved in the following manner. A dummy capacitive source, such as another piezoelectric device (PEG2), is used in addition to the power source, piezoelectric device (PEG1), which is switched to the load. Whereas the output of PEG1 is distorted as shown for Vx in FIGS. 12F, 12F1 and 5, the output of PEG2 will remain as shown for Voc in FIGS. 12D and 12F and Ep in FIG. 5. The output of PEG2 may be fed into a high impedance circuit whereby a signal (e.g., a sine wave or oscillatory signal) which is true to the original can be sensed and used to control the switching of the inductive load via S1 across PEG1. Thus, as shown in FIG. 12G, PEG1 may be termed a power collector and PEG2 may be termed a sensor and the output of PEG2 is applied to a peak detector 130 which is used to control the closing of switch S1 at each positive and negative peak of the input signal. Thus, while the output of the power collecting device PEG1 may be a highly complex, high amplitude transient voltage, the output of the sensor device PEG2 will be conform to the driving signal. Thus, if the driving signal on PEG1 and PEG2 is a relatively smooth sine wave, PEG2 will respond and produce a sinusoidal cause and cause PEG1 to be switched and function in the switched-resonant power collection mode as discussed above. Concurrently, PEG2 will be used by the peak detector to accurately and reliably sense the peaks and troughs of the smooth sine wave and to control the switching of PEG1.

Figure 12H:
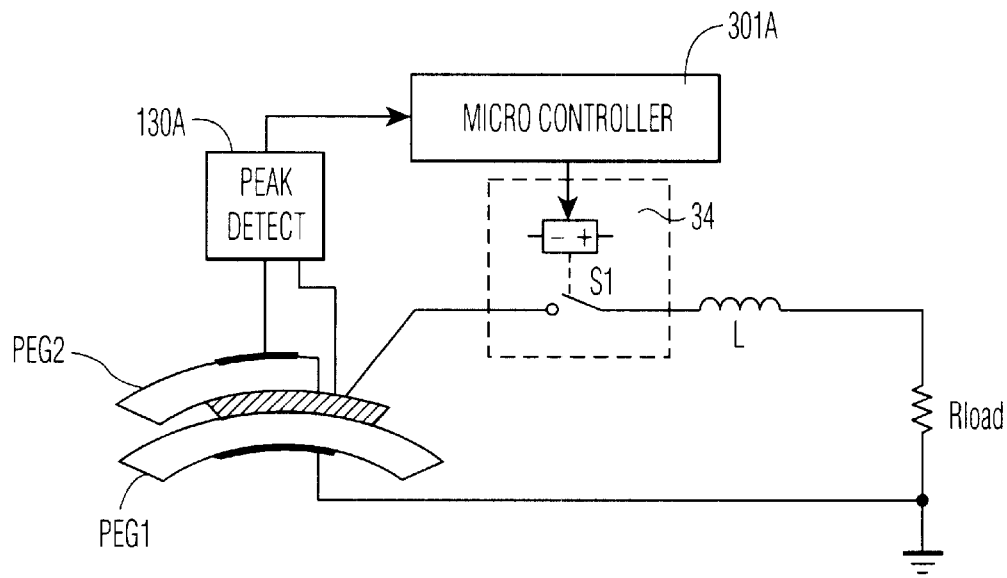

PEG2 may be of the same material as PEG1 so as to have similar characteristics. PEG2 may be mounted on PEG1, as shown in FIG. 12H, so as to sense the same or similar stresses applied to PEG 1. Typically, PEG2 would be made smaller than PEG1 and may be connected or attached (e.g., glued) to PEG1 in any number of ways. The output of PEG2 will mirror the output of PEG1, with the output of PEG2 being generally smaller in amplitude. Where PEG1 is very large, PEG2 may be comprised of a number of different piezoelectric devices to sense different portions of the corresponding PEG 1.

As also shown in FIG. 12H, the output of PEG2 can be fed to a peak detector circuit 130a whose output is fed to a microcontroller 301a which can process the signal received from the peak detector and provide turn-on and turn-off signals to switch S1. Referring to FIG. 2 note that wave peak sensor 200 may be a PEG2 type sensor or any other suitable sensor. Similarly in FIG. 2 the peak detector that fires pulses at peaks 34 may be a peak detector such as 130a and microcontroller 301a shown in FIG. 12H.

Using a "sensing" PEG, it is much easier to detect the peak and to generate signals to control the turn-on and turn-off of switch S1 at the proper time. Thus a peak detecting scheme in accordance with one aspect of the invention may include two capacitive elements; one to collect power and to be switched into a resonant power collecting circuit, and the other to monitor the open circuit voltage to enable an easier form of peak detection.

For ease of illustration, it has been assumed that PEG1 is being stressed in a sinusoidal manner. However, it should be understood that this is not a necessary condition as long as the periodic positive and negative peaks of an input signal are detected and control a switch closure coupling an inductive network across a piezoelectric device at the right time for the proper length of time.

Figure 13:
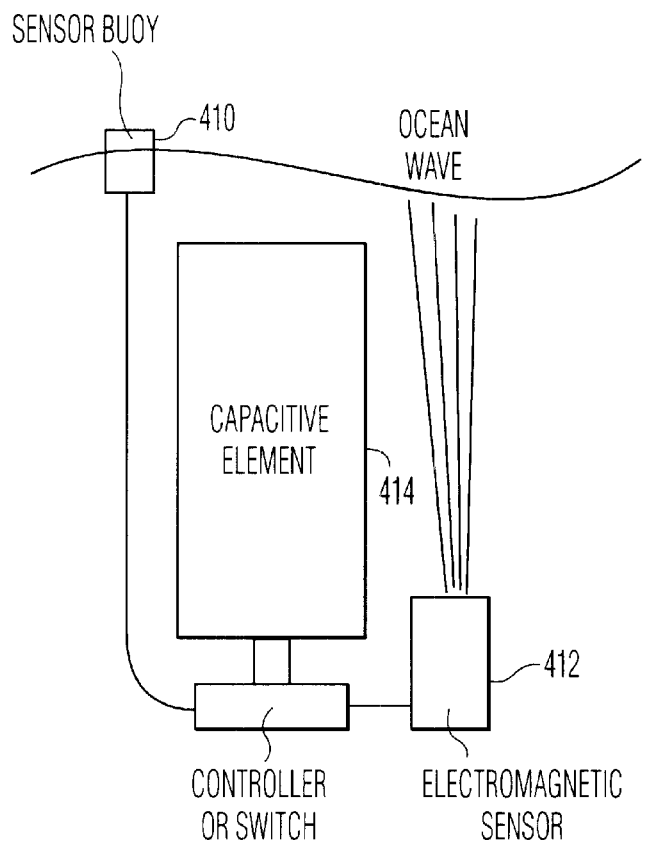
FIGS. 13, 14, 15 and 16 are diagrams illustrating other peak detection schemes embodying the invention.

Depending on the nature of the mechanical system being used in the switched resonance mode, different types of sensors may be used. For example, if an ocean wave power device is being used, a small wave sensor buoy 410 can detect the characteristic of an incoming wave and generate signals which are then used to control the turn-on and turn-off of switch S1, as shown in FIG. 13. In the system of FIG. 13 the sensor could anticipate the wave which would impinge on the transducer a moment later. FIG. 3 illustrate that the transducer may be a Buoy 414. The sensor 410 may be a wave rider physically located just before the transducer. So placed, the sensor is in a position to alert the power capturing and converting system so that appropriate changes in the system can be introduce and be taken care of before the wave impinges on (or hits) the transducer which can be any device (e.g., a piezoelectric device or a buoy) capable of producing an electric signal in response to a mechanical input force.

Still another scheme may include electromagnetic sensors 412 as shown in FIG. 13 to sense wave height using radio waves. Many different types of sensors may be used so long as they can reliably detect peak signals and be used to turn on the switch S1 for the required time period Tc. Nevertheless, the use of a separate sensor operating in parallel to the main power device greatly simplifies the cost, size, and amount of equipment needed.

Figure 14:
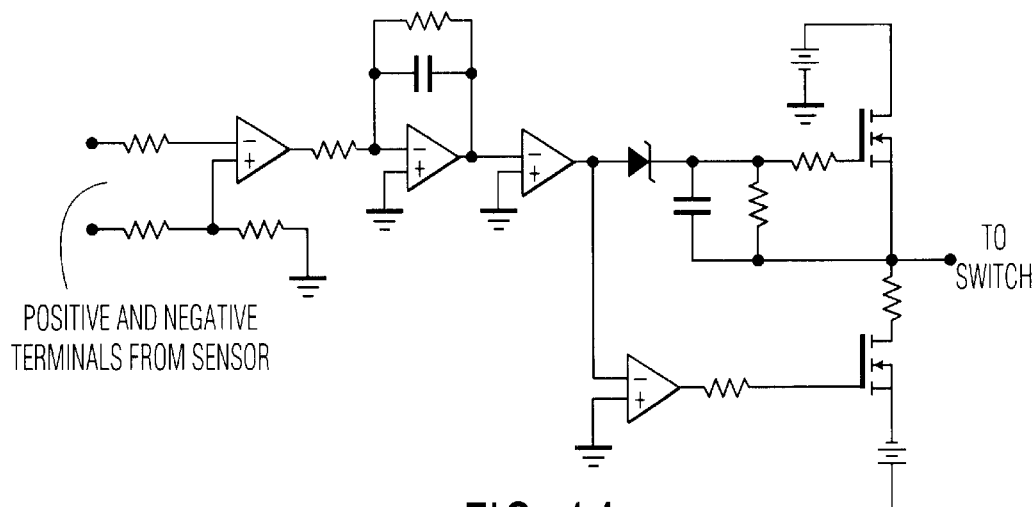

Once a signal is detected by a sensor, a number of circuits can be used to detect the peaks and troughs of the circuit. Peak detectors have been studied extensively in electronics, and many different kinds have been used in thousands of different applications. In the case of a piezoelectric that is driven by the a mechanical source such as ocean waves or river currents, the source may have a frequency and amplitude which varies slightly due to environmental changes and random turbulence. Under such conditions, it is necessary to develop a peak detection scheme that is flexible enough to adapt to changing conditions as shown in FIG. 14.

Figure 15:
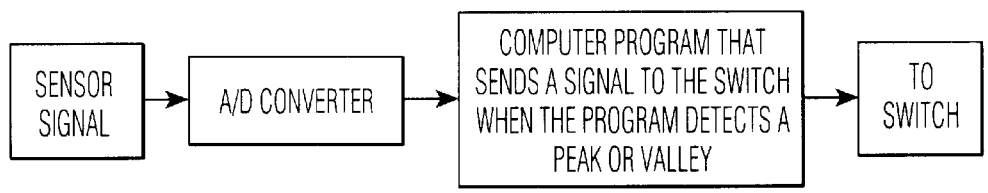

Digitizing the signal from the sensor, fitting it to a curve through software, and then predicting when the peak will occur is one method of doing this as shown in FIG. 15. However, such calculations may require a significant amount of computational sophistication, time, and power.

Figure 16:
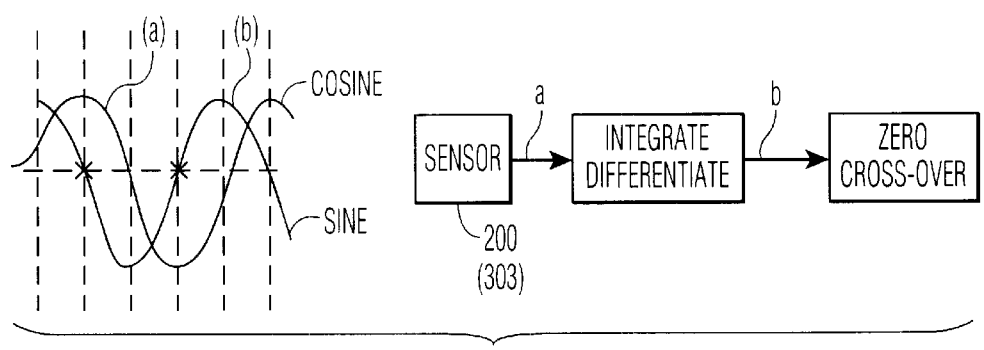

Another method of performing peak detection is shown in FIG. 16. If the input force is approximately sinusoidal, then a sinusoid sensor signal (a) can be integrated or differentiated to get a cosine wave which can be applied to simple op-amp circuit. Then, the zero crossings of the integrated/differentiated signal may be detected. If the integration/differentiation is perfect, and the signal is a true sinusoid, then the zero crossings will occur at exactly the peak of the sensor signal. Other electronics (not shown) can be used to detect a zero crossing and generate a pulse, which can be used to trigger a switch closure.

It should be understood that the switched resonance approach of the invention is applicable to any system in which the driving force varies slowly. Also, it should be appreciated that the stress and strain applied to the piezoelectric device, or any device which produces an electric voltage when stressed, may be provided by ocean waves or by being placed in a river or stream with means in the river or stream causing alternating ripples to spiral downstream and cause the piezo devices to bend around them. The piezo devices than look like a flag flapping or an eel swimming in the water. Thus, ocean surface waves and any underwater waves (or the wind) may be used. These may be referred to as mechanical (forcing) waves or naturally recurring forces like ocean surface waves and oscillating underwater or water surface vortices.

What is claimed is:

1. A combination comprising:
   a transducer responsive to a naturally recurring force having at least first and second terminals for producing therebetween electrical signals in response to the naturally recurring force; said transducer being characterizable as having a capacitance in series with a voltage source between said first and second terminals;
   an inductor having first and second ends;
   a selectively enabled switch;
   a load to be powered by the electrical signals produced by the transducer having at least first and second power terminals;
   means connecting said selectively enabled switch in series with said inductor and said load between said first and second terminals of said transducer; and
   means for turning on said selectively enabled switch in response to certain peak conditions of the electrical signals produced by the transducer for a period of time.

2. The combination as claimed in claim 1, wherein said inductor has a predetermined inductance of value L, and wherein said transducer has a capacitance of value Cp; wherein when the switch is closed the transducer and the inductor define a resonant circuit whose resonant frequency, fo, is approximately equal to $\frac{1}{2}\pi(LCp)^{0.5}$ and wherein the switch is closed for a period of time which is approximately equal to $Tc = \pi(LCp)^{0.5}$.

3. The combination as claimed in claim 2, wherein the selectively enabled switch is connected between the first terminal of the transducer and the first end of the inductor and wherein the second end of the inductor is connected to the first power terminal of the load and wherein the second power terminal of the load is connected to the second terminal of the transducer.

4. The combination as claimed in claim 2, wherein the first terminal of the transducer is connected to the first end of the inductor and wherein the selectively enabled switch is connected between the second end of the inductor and the first power terminal of the load and wherein the second power terminal of the load is connected to the second terminal of the transducer.

5. The combination as claimed in claim 2, wherein the first terminal of the transducer is connected to the first end of the inductor and wherein the second end of the inductor is connected to the first power terminal of the load and wherein the selectively enabled switch is connected between the second power terminal of the load and the second terminal of the transducer.

6. The combination as claimed in claim 2, wherein the naturally recurring force has a nominal frequency in the range of f1 and wherein the value of L is selected such that the resonant frequency, fo, of the resonant circuit is selected to be substantially greater than f1.

7. The combination as claimed in claim 2, wherein the transducer is a piezoelectric device, wherein the transducer is designed to be placed in a body of water and wherein the naturally recurring force comprises the waves in the body of water, said waves having a frequency in the range of f1.

8. The combination as claimed in claim 7, wherein the selectively enabled switch is closed each time a wave reaches a peak condition and each time a wave reaches a trough condition.

9. The combination as claimed in claim 7, wherein the selectively enabled switch remains closed for a period of time which is approximately equal to Tc, after which time the switch is opened and remains open until the next peak or trough.

10. The combination as claimed in claim 8 further including a sensor for sensing the peaks and troughs of the waves for closing the selectively enabled switch in response to the peaks and troughs.

11. The combination as claimed in claim 10 wherein the sensor includes a device floating on the waves and located ahead of the transducer for anticipating the effect of the waves before they reach the transducer.

12. The combination as claimed in claim 10 wherein the sensor is made of similar material as the transducer and is located in proximity to the transducer so as to be subjected to similar driving forces as the transducer.

13. The combination as claimed in claim 10, wherein the transducer is a piezoelectric device, and wherein the sensor is also a piezoelectric device for sensing the effects of the waves on the transducer absent switching.

14. A system comprising:
   a transducer responsive to a naturally recurring force for producing an electric signal between first and second electrodes; wherein said naturally recurring force fluctuates between a high value and a low value;
   a selectively enabled switching means for selectively coupling an inductive network and a load impedance in series between said first and second electrodes;
   means for detecting the high, peak, value and the low, trough, value of the naturally recurring force and for then enabling the selectively enabled switching means for a given period of time.

15. The system as claimed in claim 14 wherein the transducer is a first piezoelectric transducer; and wherein the means for detecting the high and low values of the naturally recurring force includes a second piezoelectric transducer for sensing the condition of the input force and generating an unloaded and unswitched signal to enable the detection of the high and low values without switching distortion.

16. The system as claimed in claim 15 wherein the transducers are placed in a body of water, wherein the naturally recurring force includes the waves in the body of water having a frequency in the range of f1, and wherein the first transducer may be characterized as a voltage source in series with a capacitance and wherein the inductive network is selected to have a value which, when the selectively enabled switch is closed, resonates with the capacitance of the first transducer at a frequency, fo, which is substantially greater than f1.

17. A system as claimed in claim 14 wherein the output of the first transducer is subject to large transient signals when the load is switchably connected to the first transducer; and wherein the means for detecting the peaks and troughs includes a second transducer having similar characteristics as the first transducer and sensing circuitry fixedly connected across the output of the second transducer for continuously sensing its output without the injection of switching transients.

18. A system as claimed in claim 17 wherein the first and second transducers are piezoelectric devices with the first transducer for collecting a substantial amount of power and the second transducer for sensing the signal that would be generated absent the selectively enabled switching.

19. A system as claimed in claim 18 wherein the output of the second transducer is used to generate signals used to control the turn on of the selectively enabled switch.

20. A system as claimed in claim 18, wherein the second transducer is mounted in close proximity to the first transducer for ensuring that the second transducer sees the same naturally recurring force as the first transducer, with both transducers being placed in a body of water and both transducers responding to the frequency and amplitude of the waves in the body of water.

21. In a system in which the output of a transducer responsive to a naturally recurring force, for collecting power from the force, is to be switchably connected to a load when the naturally recurring force goes through a peak or a valley and wherein the switching causes large transient signals to be produced at the output of the transducer masking the time at which the naturally occurring force goes through a peak or a valley, the improvement comprising:
   A sensor located so as to sense the forces impinging on the transducer, independently of the transducer, and for producing signals controlling the switching of the load to the transducer independent and unaffected by the large transient signals.

22. In a system as claimed in claim 21 wherein the naturally recurring force are ocean waves and wherein the sensor is an electromagnetic sensor used to detect the waves which impinge on the transducer and from which the transducer collects energy.

23. In a system as claimed in claim 21 wherein the naturally recurring force are ocean waves and wherein the transducer and the sensor are piezoelectric devices, with the being sensor used to detect the force of waves which impinge on the transducer and from which the transducer collects energy.

24. In a system as claimed in claim 21 wherein the transducer is characterizable as having a capacitance in series with a voltage source between first and second terminals; and wherein the load is switchably connected via an inductive element across said first and second terminals, with the value of the inductance being selected such that it can resonate with the transducer capacitance at a much higher frequency than the frequency of the naturally recurring force.

25. In a system as claimed in claim 21 wherein the naturally recurring force are ocean waves and wherein the sensor is part of a float riding on the waves and located so as to anticipate the wave impinging on the transducer.

26. A system in which the output of a transducer responsive to a naturally recurring force, for collecting power from the force, is switchably connected to a load and wherein the switching causes large transient signals to be produce at the output of the transducer means for detecting when positive and negative peak conditions of the naturally recurring force occur comprising:
    a peak detector circuit coupled to the output of the transducer for generating a signal each time the output of the transducer reaches a positive peak and a negative peak; and said signal for switchably connecting the load across the transducer to transfer energy collected by the transducer to the load.

27. In a system in which the output of a transducer responsive to a naturally recurring force, for collecting power from the force, is to be switchably connected to a load when the naturally recurring force goes through a peak or a valley and wherein the switching causes large transient signals to be produced at the output of the transducer masking the time at which the naturally occurring force goes through a peak or a valley, the improvement comprising:
    means for processing the output of the transducer to produce a signal of a sinusoidal nature and to then differentiate or integrate the signal to produce a cosine function and to then make use of the cross over of the cosine function to determine the peak conditions of the input wave.

28. A combination comprising:
    a transducer which, in response to a naturally recurring force having a frequency in the range of f1, produces electrical signals between first and second terminals; said transducer being characterizable as having a capacitance in series with a voltage source between said first and second terminals;
    an inductor having first and second ends;
    a selectively enabled switch;
    a load to be powered by the electrical signals produced by the transducer having at least first and second power terminals;
    means connecting said selectively enable switch in series with said inductor between said first and second terminals of said transducer;
    means for turning on said selectively enabled switch for a period of time in response to certain peak conditions of the electrical signals produced by the transducer for periodically transferring power from the transducer to the load; and
    wherein the impedance of the load is selected to have a value which enhances optimum power transfer.

29. The combination as claimed in claim 28 wherein when the switch is closed there is formed a series loop which includes at least the transducer, the inductive element, the switch and the load; and wherein the loop, excluding the load, may be characterized as having an equivalent resistance (Rs); and wherein the value of the load impedance is a function of the series resistance Rs, the inductance of the inductor, the capacitance of the transducer, the frequency of the input force and a loss time constant associated with the transducer.

30. The combination as claimed in claim 28, wherein said inductor has a predetermined inductance of value L, and wherein said transducer has a capacitance of value Cp; wherein when the switch is closed the transducer and the inductor define a resonant circuit whose resonant frequency, fo, is equal to $\frac{1}{2}\pi(LCp)^{0.5}$ and wherein the switch is closed for a period $Tc=\pi(LCp)^{0.5}$; and wherein when the switch is closed there is formed a series loop which includes at least the transducer, the inductive element, the switch and the load; and wherein the loop, excluding the load, may be characterized as having an equivalent resistance (Rs); and wherein the optimum value (RLopt) of the load impedance is a function of the series resistance Rs, the inductance of the inductor, the capacitance of the transducer, the frequency of the input force and a loss time constant associated with the transducer.

31. The combination as claimed in claim 30 wherein:
    (RLopt)=Rs+2Ro/Qc; where
        Rs is the equivalent resistance in the series path;
        Ro is approximately equal to $(L/Cp)^{0.5}$; and
        Qc is approximately equal to $(2\pi)(f1)(\tau)$, where f1 is the input frequency of the recurring force; and $\tau$ is a dielectric loss term associated with the transducer.

32. The combination as claimed in claim 31 further including means coupled to the load for maintaining its value equal to RLopt as a function of variations in the frequency of the naturally recurring force applied to the transducer.

33. The combination as claimed in claim 31 wherein the load includes a full wave rectifying bridge network connected in the series leg of the loop and resistive networks connected across an output of the bridge network.

34. The combination as claimed in claim 33 wherein the load includes at lest one of a battery, a storage capacitor and a resistor.

35. The combination as claimed in claim 28, wherein the value of the load impedance is varied as a function of the frequency of the naturally recurring force applied to the transducer.

36. The combination as claimed in claim 28, wherein the transducer is a piezoelectric device.

37. The combination as claimed in claim 28 wherein the transducer is a piezoelectric device intended for placement in a body of water and wherein the naturally recurring force includes periodic movement in the body of water.

38. The combination as claimed in claim 37 wherein the means for turning on the switch includes a sensor for sensing variations in the movement in the body of water for controlling the turn on and turn off of the switch.

39. A combination comprising:
    a transducer which, in response to a naturally recurring force having a frequency in the range of f1, produces electrical signals between first and second terminals; said transducer being characterizable as having a capacitance in series with a voltage source between said first and second terminals; an inductor having first and second ends;
    a selectively enabled switch;
    a load to be powered by the electrical signals produced by the transducer having at least first and second power terminals;
    means connecting said selectively enable switch in series with said inductor between said first and second terminals of said transducer;
    means for turning on said selectively enabled switch for a period of time in response to certain peak conditions of the electrical signals produced by the transducer for periodically transferring power from the transducer to the load; and wherein when the switch is opened and closed large positive and negative transient signals are produced at the output of the transducer; and wherein the switch is formed and turned on and to render its operation impervious to the large transient signals.

40. The combination as claimed in claim 39 wherein the switch includes: the conduction path of an N type transistor connected between a first node and a second node and the conduction path of a P-type transistor connected between the second node and a third node; and a first diode connected between the first and second nodes poled to conduct conventional current from the second node into the first node and a second diode connected between the second and third nodes and poled to conduct current from the second node into the first node.

41. The combination as claimed in claim 39 wherein the switch is connected between first and second nodes and includes the conduction path of an N type transistor connected in series with a first diode between the first and second nodes with the firs diode poled to conduct current from the first node into the second node; and the conduction path of a P-type transistor connected in series with a second diode between the first and second nodes and the second diode being poled to conduct current from the second node into the first node.

42. The combination as claimed in claim 39 including means for rectifying the voltage developed across the transducer and for generating large positive and negative voltages for generating large negative and positive voltages for controlling the turn on and turn-off of the switch.

43. The combination as claimed in claim 39 wherein the switch is turned on and turns itself off when the current through the switch goes to, or close to, zero.

44. The combination as claimed in claim 39 wherein the switch is turned on and then turned off after a predetermined period.

* * * * *